(12) United States Patent
Okitsu

(10) Patent No.: US 6,868,868 B2
(45) Date of Patent: Mar. 22, 2005

(54) MANIFOLD REGULATOR APPARATUS

(75) Inventor: Masayuki Okitsu, Yawara-mura (JP)

(73) Assignee: SMC Corporation, Tokyo (JP)

( * ) Notice: Subject to any disclaimer, the term of this patent is extended or adjusted under 35 U.S.C. 154(b) by 103 days.

(21) Appl. No.: 10/339,236

(22) Filed: Jan. 9, 2003

(65) Prior Publication Data
US 2003/0136452 A1 Jul. 24, 2003

(30) Foreign Application Priority Data
Jan. 18, 2002 (JP) .................................... 2002-009527

(51) Int. Cl.$^7$ ............................................. F16K 11/10
(52) U.S. Cl. ................................. 137/884; 137/270
(58) Field of Search ............................. 137/884, 270; 184/7.4

(56) References Cited

U.S. PATENT DOCUMENTS 4,230,143 A  * 10/1980 Dettmann et al. .......... 137/270
4,848,391 A  *  7/1989 Miller et al. ............... 137/270

FOREIGN PATENT DOCUMENTS

DE        4032515 A1   4/1992
JP        06117559 A   4/1994

* cited by examiner

Primary Examiner—John Fox
(74) Attorney, Agent, or Firm—Baker Botts LLP

(57) ABSTRACT

A manifold body allows a pressure-control knob to be disposed facing in a selected direction. The manifold body is divided into a manifold block and a regulator block. The manifold block is provided with a pressure gauge, an inport, and an outport. The regulator block is provided with a pressure-control knob and a regulator. The manifold block and the regulator block have respective fitting portions that are at an angle of 45 degrees to a mounting surface as seen in the side view. Each fitting portion is symmetric with respect to a center axis, so that the regulator block can be joined to the manifold block at either of two different angles.

8 Claims, 9 Drawing Sheets

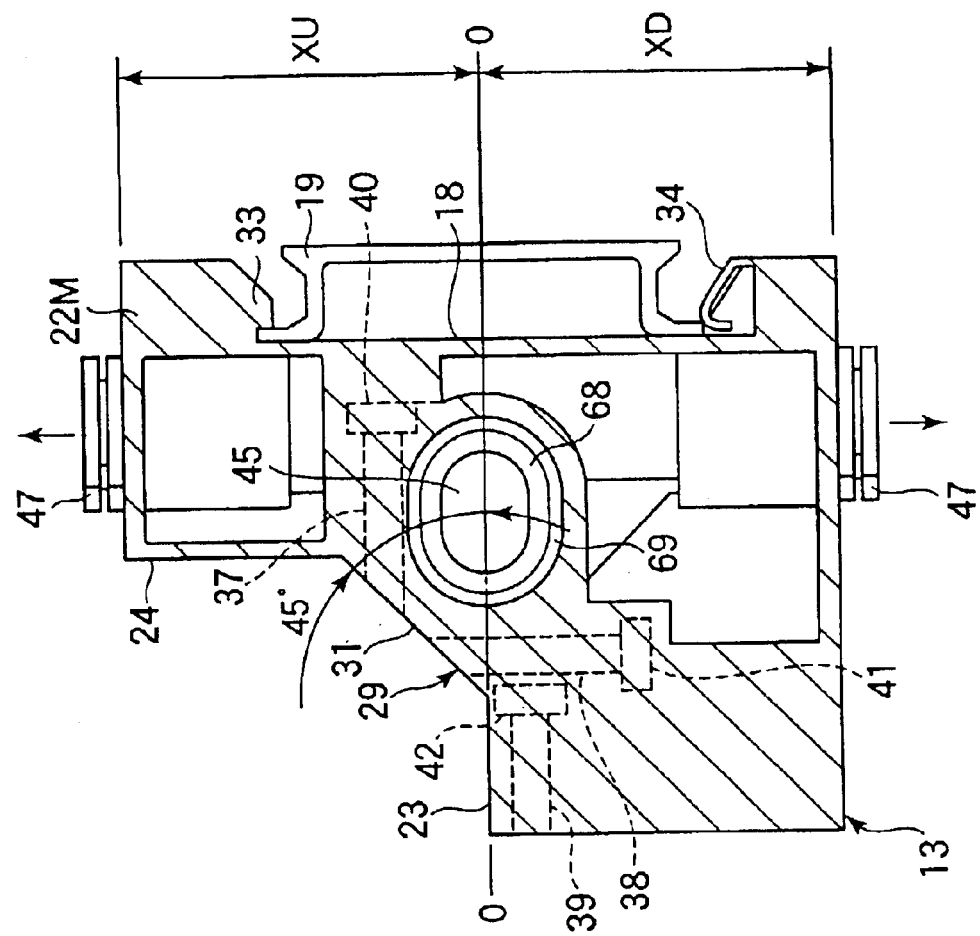
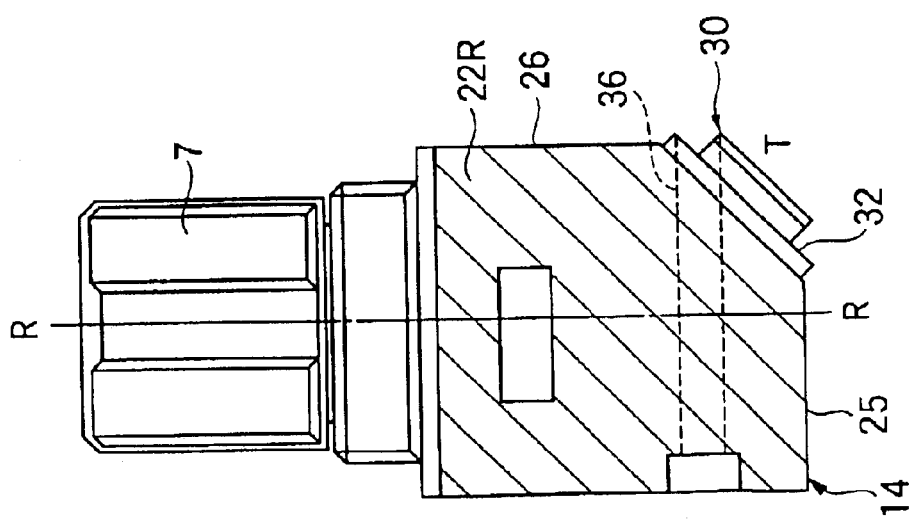

A-A

MANIFOLD REGULATOR APPARATUS

BACKGROUND OF THE INVENTION

The present invention relates to a manifold regulator apparatus having a plurality of manifold bodies arranged in a row, each manifold body being provided with a pressure-control knob, a regulator, a pressure gauge, an inport, and an outport.

FIG. 10 is a front view showing an example of conventional manifold regulator apparatus, in which manifold bodies 1 to 3 and end plates 4 and 5 are mounted on a rail 6, and the manifold bodies 1 to 3 are pressed against each other by the end plates 4 and 5 and secured with bolts 11. The three manifold bodies 1 to 3 are each provided with a pressure-control knob 7, a regulator (pressure reducing valve), a pressure gauge 8, an inport member 9, and an outport member 10. Pressure air from a pneumatic pressure source is supplied to each inport member 9 of the manifold bodies 1 to 3. After the pressure has been reduced by the regulator (not shown), the air is supplied to where it is needed from the outport member 10. In the manifold bodies 1 to 3 shown in FIG. 10, individual air supply is performed independently for each manifold body. However, it is also possible to perform common air supply by bringing the inports of a plurality of manifold bodies into communication with each other.

As seen in the front view, the three pressure-control knobs 7 are disposed to project upward from the manifold bodies 1 to 3. The three pressure gauges 8 are disposed to face forward at the respective front lower positions of the manifold bodies 1 to 3. The three inport members 9 and the three outport members 10 are disposed on the bottoms of the manifold bodies 1 to 3. If the whole manifold regulator apparatus is rotated through 180 degrees as seen in the front view, the three pressure-control knobs 7 are disposed to project downward from the manifold bodies 1 to 3. The three pressure gauges 8 are disposed to face forward at the respective front upper positions of the manifold bodies 1 to 3. The three inport members 9 and the three outport members 10 are disposed on the tops of the manifold bodies 1 to 3. Thus, the manifold regulator apparatus can be used with variations of the location of the pressure-control knobs 7 and other components.

In the manifold regulator apparatus shown in FIG. 10, the manifold bodies 1 to 3 have the same structure. That is, the location and orientation of each component, i.e. the pressure-control knob 7, the pressure gauge 8, the inport member 9 and the outport member 10, are the same. Each of the manifold bodies 1 to 3 has a first joint surface 21 and a second joint surface 22 formed on both sides thereof in order to arrange the manifold bodies 1 to 3 in a row to form a manifold regulator apparatus. The first joint surface 21 of one manifold body and the second joint surface 22 of the other manifold body are joined together (a projection formed on one joint surface is fitted into a recess formed on the other joint surface when the two manifold bodies are joined together). The manifold bodies 1 to 3 are arranged in a row, being oriented in the same direction (e.g. with the pressure-control knob 7 directed upward).

In the conventional manifold regulator apparatus, because the projection and the recess are present on the joint surfaces, the first joint surface 21 of one manifold body and the first joint surface 21 of the other manifold body cannot be joined together when either of the manifold bodies is turned through 180 degrees as seen in the front view. It is also impossible to join together the second joint surface 22 of one manifold body and the second joint surface 22 of the other manifold body. For example, the manifold bodies 1 to 3 cannot be joined together in such a way that the manifold bodies 1 and 3 are placed in a regular position where each pressure-control knob 7 projects upward, whereas the manifold body 2 is placed in a reverse position where the pressure-control knob 7 projects downward. It is also impossible to dispose the pressure-control knobs 7 on the front sides of the manifold bodies 1 to 3. That is, the location and orientation of the pressure-control knob 7, the pressure gauge 8, the inport member 9 and the outport member 10 on the manifold body have been predetermined. It is impossible to select a location or orientation other than the predetermined one. In other words, there is no freedom to select a desired location and orientation of each member.

SUMMARY OF THE INVENTION

A first object of the present invention is to provide a manifold body that is divided into a manifold block and a regulator block and arranged so that the regulator block, which has a pressure-control knob, can be disposed facing in a selected direction (either upward or downward, or forward) according to a selected position (an upper position or a lower position) of the manifold block.

A second object of the present invention is to enable an inport and an outport of the manifold block to be respectively communicated with a primary-side chamber and a secondary-side chamber of a regulator in the regulator block regardless of the selected direction of the regulator block.

A third object of the present invention is to enable the regulator block and the manifold block to be connected together easily regardless of the selected direction of the regulator block.

A fourth object of the present invention is to enable an inport and an outport to be disposed at desired positions on the top or bottom of the manifold block as seen in the front view.

A fifth object of the present invention is to make it not only possible to join together a manifold body in the regular position and a manifold body in the regular position, but also possible to join together a manifold body in the regular position and a manifold body in the reverse position in a manifold body assembly or a manifold regulator apparatus.

A sixth object of the present invention is to realize both individual air supply and common air supply in a single manifold regulator apparatus.

A seventh object of the present invention is to enable a regulator block to be disposed facing in a selected direction (either upward or downward, or forward) according to a selected position (an upper position or a lower position) of a mounting-block.

The present invention is applied to a manifold body having a first joint surface and a second joint surface that are flat and perpendicular to a mounting surface. According to a first arrangement of the present invention, the manifold body is divided into a manifold block and a regulator block. The manifold block is provided with a pressure gauge, an inport, and an outport. The regulator block is provided with a pressure-control knob and a regulator. The manifold block and the regulator block have respective fitting portions that are at an angle of 45 degrees to the mounting surface as seen in the side view. Each fitting portion is symmetric with respect to a center axis perpendicular to both the first joint surface and the second joint surface, so that the regulator block can be joined to the manifold block at either of two different angles. It should be noted that the term "an angle of 45 degrees as seen in the side view" shall include angles around 45 degrees at which the function of fitting can be exhibited.

A second arrangement of the present invention is as follows. As seen in the side view, the manifold block in the first arrangement has a third joint surface and a fourth joint surface respectively provided at both ends of the fitting portion thereof contiguously with the fitting portion. The third joint surface is perpendicular to the mounting surface. The fourth joint surface is parallel to the mounting surface. The regulator block has a fifth joint surface and a sixth joint surface respectively provided at both ends of the fitting portion thereof. The fifth joint surface is at an angle of 45 degrees to the contact surface of the fitting portion and perpendicular to the center line of the regulator block, and the sixth joint surface is at an angle of 45 degrees to the contact surface of the fitting portion and parallel to the center line of the regulator block, so that the fitting portion of the manifold block and the fitting portion of the regulator block can be fitted to each other in either of two selectable positions, that is, a first position where the third joint surface and the fifth joint surface are joined together and the fourth joint surface and the sixth joint surface are joined together, and a second position where the third joint surface and the sixth joint surface are joined together and the fourth joint surface and the fifth joint surface are joined together.

A third arrangement of the present invention is as follows. In the first or second arrangement, a communicating inport is formed in the center of each of the fitting portions of the manifold block and the regulator block, and communicating outports are formed at respective positions on both sides of the communicating inport that are equidistant from the communicating inport, so that when the manifold block and the regulator block are fitted to each other, the communicating inport of the manifold block and the communicating inport of the regulator block are communicated with each other, and the communicating outports of the manifold block and the communicating outports of the regulator block are communicated with each other. It should be noted that one of the outports of the manifold block may be closed.

A fourth arrangement of the present invention is as follows. In the second or third arrangement, the regulator block has a bolt insertion hole formed therein parallel to the fifth joint surface to secure the regulator block to the manifold block, and the manifold block has a bolt insertion hole for the first position and a bolt insertion hole for the second position. A nut is disposed in each of the bolt insertion holes for the first position and the second position. The distance from the fifth joint surface of the regulator block to the center line of the bolt insertion hole is equal to the distance from the third joint surface of the manifold block to the center line of the bolt insertion hole for the first position and also equal to the distance from the fourth joint surface of the manifold block to the center line of the bolt insertion hole for the second position.

A fifth arrangement of the present invention is as follows. In the third or fourth arrangement, an inport and an outport open on each of the top and bottom of the manifold block as seen in the front view. The inport is communicated with the communicating inport of the manifold block. The outport is communicated with either or both of the communicating outports of the manifold block. A desired inport and a desired outport are closed.

In addition, the present invention provides a manifold regulator apparatus including a plurality of manifold bodies according to the first to fifth arrangements. The manifold bodies are arranged in a row. According to a sixth arrangement of the present invention, each of the manifold bodies can assume a regular position and a reverse position. The reverse position is a position attained by turning the manifold body through 180 degrees from the regular position as seen in the front view. Thus, it is not only possible to join together a manifold body in the regular position and a manifold body in the regular position, but it is also possible to join together a manifold body in the regular position and a manifold body in the reverse position. The mounting surface may be formed on the back of the manifold body as seen in the front view. The mounting surface can be mounted on a rail, a body, etc.

In addition, the present invention provides a manifold regulator apparatus including a plurality of manifold bodies arranged in a row. Each of the manifold bodies is provided with a pressure-control knob, a regulator, a pressure gauge, an inport, and an outport. According to a seventh arrangement of the present invention, each of the manifold bodies has a first joint surface and a second joint surface that are flat and perpendicular to a mounting surface, and can assume a regular position and a reverse position. The reverse position is a position attained by turning the manifold body through 180 degrees from the regular position as seen in the front view. Thus, it is not only possible to join together a manifold body in the regular position and a manifold body in the regular position, but it is also possible to join together a manifold body in the regular position and a manifold body in the reverse position.

An eighth arrangement of the present invention is as follows. In the sixth or seventh arrangement, the manifold block has a common in-passage extending through the center thereof as seen in the side view. The common in-passage is communicated with the communicating inport. The first joint surface and the second joint surface have insertion grooves formed around the common in-passage. When a plurality of manifold blocks are joined together, a cut-off bush for cutting off communication between the common in-passages or a communicating bush for providing communication between the common in-passages is inserted into the insertion grooves.

In addition, the present invention provides a regulator block having first and second vertical and flat joint surfaces formed on the left and right sides thereof as seen in the front view. The regulator block is provided with a pressure-control knob and a regulator. According to a ninth arrangement of the present invention, a fitting portion of a mounting block and a fitting portion of the regulator block are at an angle of 45 degrees to the center line of the regulator block as seen in the side view, and each fitting portion is symmetric with respect to a center axis perpendicular to both the first and second joint surfaces, so that the regulator block can be joined to the mounting block at either of two different angles.

In general, the manifold block is defined as "a block in which a passage serving as piping is formed and which is adapted for mounting two or more devices on the outside thereof". In the present invention, however, the manifold block is defined as "a block in which a passage serving as piping is formed and which is adapted for mounting one or more devices on the outside thereof".

The manifold body according to the first and second arrangements of the present invention is divided into a manifold block and a regulator block and arranged so that the regulator block, which has a pressure-control knob, can be disposed facing in a selected direction (either upward or downward, or forward) according to a selected position (an upper position or a lower position) of the manifold block.

The manifold body according to the third arrangement of the present invention allows an inport and an outport of the manifold block to be respectively communicated with a primary-side chamber and a secondary-side chamber of a regulator in the regulator block regardless of the selected direction of the regulator block.

The manifold body according to the fourth arrangement of the present invention allows the regulator block and the manifold block to be connected together easily regardless of the selected direction of the regulator block. The manifold body according to the fifth arrangement of the present invention allows an inport and an outport to be disposed at desired positions on the top and bottom of the manifold block as seen in the front view. An inport or an outport that is not used can be closed.

The manifold regulator apparatus according to the sixth and seventh arrangements of the present invention make it not only possible to join together a manifold body in the regular position and a manifold body in the regular position, but also possible to join together a manifold body in the regular position and a manifold body in the reverse position. In addition, the regulator block can be disposed according to a selected position (an upper position or a lower position) of the manifold block.

The manifold regulator apparatus according to the eighth arrangement of the present invention allows both individual air supply and common air supply to be realized in a single manifold regulator apparatus and makes it possible to select freely a desired location and orientation of a pressure-control knob, a pressure gauge, an inport and an outport on each manifold body.

The regulator block having a pressure-control knob according to the ninth arrangement of the present invention can be disposed facing in a selected direction (either upward or downward, or forward) according to a selected position (an upper position or a lower position) of the mounting block.

BRIEF DESCRIPTION OF THE DRAWINGS

FIG. 1A is an enlarged right-hand side view of a manifold block of a manifold regulator apparatus according to the present invention.

FIG. 1B is an enlarged right-hand side view of a regulator block of the manifold regulator apparatus according to the present invention.

DESCRIPTION OF THE PREFERRED EMBODIMENTS

Figure 2D:
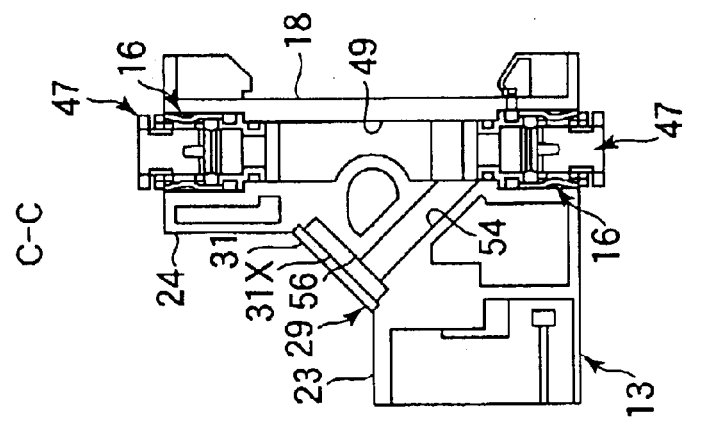
FIG. 2D is a sectional view taken along the line C—C in FIG. 2A.

FIGS. 1A to 9 show embodiments of the manifold regulator apparatus according to the present invention. As shown in FIGS. 1A and 1B, a manifold body is divided into a manifold block 13 as shown in FIG. 1A and a regulator block 14 as shown in FIG. 1B. When the manifold regulator apparatus is used, the manifold block 13 and the regulator block 14 are connected together as shown in FIGS. 6A, 6B, 7A to 7D, etc. The manifold block 13 is provided with a pressure gauge 8 (see FIGS. 4 and 6B), an inport 15 and an outport 16 (see FIGS. 2A to 2D). The regulator block 14 is provided with a pressure-control knob 7 and a regulator 64 (see FIG. 3B).

Figure 6B:
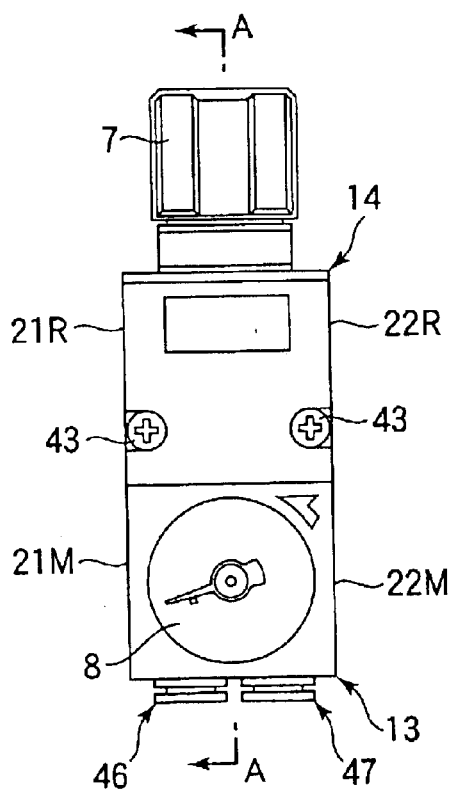
FIG. 6B is a front view of the regulator block connected to the manifold block.

As shown in FIG. 6B, the manifold block 13 is formed with a first joint surface 21M and a second joint surface 22M. The regulator block 14 is also formed with a first joint surface 21R and a second joint surface 22R. The sum total of the first joint surface 21M of the manifold block 13 and the first joint surface 21R (or the second joint surface 22R) of the regulator block 14 corresponds to the first joint surface of the manifold body. Similarly, the sum total of the second joint surface 22M of the manifold block 13 and the second joint surface 22R (or the first joint surface 21R) of the regulator block 14 corresponds to the second joint surface of the manifold body. When the regulator block 14 is connected to the manifold block 13, the first joint surfaces 21M and 21R and the second joint surfaces 22M and 22R form flat surfaces, respectively, which are both perpendicular to a mounting surface 18 (see FIGS. 6A and 6B).

Figure 7A:
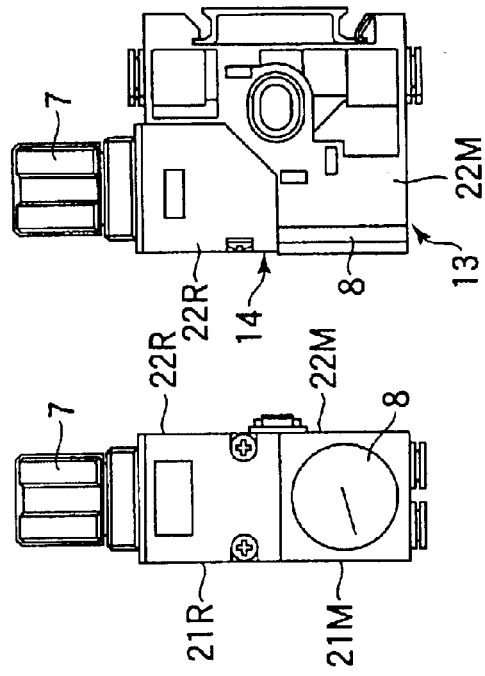
FIGS. 7A to 7D are explanatory views for describing the fact that there are four different ways of connecting together the manifold block and the regulator block in terms of location and orientation.

In FIGS. 1A and 1B, the hatched portion is the flat surface composed of the second joint surfaces 22M and 22R. Non-hatched portions inside the hatched portion are recessed portions. The center line O—O written in FIG. 1A, which extends horizontally in the vertical middle of the manifold block 13, is perpendicular to the mounting surface 18 and lies in the vertical middle of a rail 19. The length XU from the center line O—O to the upper end of the manifold block 13 and the length XD from the center line O—O to the lower end of the manifold block 13 are equal to each other. The manifold block 13 can assume either a regular position as shown in FIGS. 1A, 7A, etc. or a reverse position (see FIG. 7B and so forth) attained by turning the manifold block 13 through 180 degrees from the regular position as seen in the front view. When a manifold block 13 in the regular position and a manifold block 13 in the reverse position are mounted on the rail 19 adjacently to each other, the top and bottom end surfaces of the two manifold blocks 13 are flush with each other. It is not only possible to join together a manifold body in the regular position and a manifold body in the regular position, but it is also possible to join together a manifold body in the regular position and a manifold body in the reverse position.

Figure 6A:
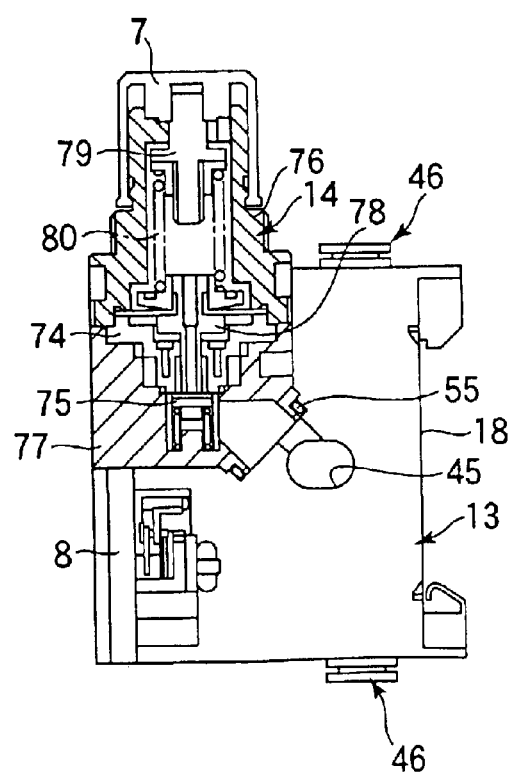
FIG. 6A is a sectional view taken along the line A—A in FIG. 6B.

When the regulator block 14 is fitted to the manifold block 13 as shown in FIG. 6A, a contact surface 31 of a fitting portion 29 of the manifold block 13 and a contact surface 32 of a fitting portion 30 of the regulator block 14 are, as shown in FIGS. 1A and 1B, at an angle of 45 degrees to the mounting surface 18 as seen in the side view. In FIGS. 1A and 1B, the angle between the center line O—O extending horizontally through the vertical center position and the contact surfaces 31 and 32 is shown to be 45 degrees. It should be noted that the angle between the contact surfaces 31 and 32 and the mounting surface 18 is also 45 degrees. At both ends of the fitting portion 29 of the manifold block 13 as seen in the side view, a third joint surface 23 and a fourth joint surface 24 are provided contiguously with the fitting portion 29. The third joint surface 23 is perpendicular to the mounting surface 18. The fourth joint surface 24 is parallel to the mounting surface 18. At both ends of the fitting portion 30 of the regulator block 14, a fifth joint surface 25 and a sixth joint surface 26 are provided contiguously with the fitting portion 30. The fifth joint surface 25 is at an angle of 45 degrees to the extension of the contact surface 32 of the fitting portion 30 and perpendicular to the center line R—R of the regulator block 14. The sixth joint surface 26 is at an angle of 45 degrees to the extension of the contact surface 32 of the fitting portion 30 and parallel to the center line R—R of the regulator block 14.

When the fitting portion 30 of the regulator block 14 is fitted to the fitting portion 29 of the manifold block 13, it is possible to choose between a first position (see FIGS. 7A and 7B) where the third joint surface 23 and the fifth joint surface 25 are joined together and the fourth joint surface 24 and the sixth joint surface 26 are joined together, and a second position (see FIGS. 7C and 7D) where the third joint surface 23 and the sixth joint surface 26 are joined together and the fourth joint surface 24 and the fifth joint surface 25 are joined together. The mounting surface 18 is mounted on the rail (DIN rail) 19 of the manifold block 13 or on a body block or the like. When the mounting surface 18 is mounted on the rail 19, a hook portion 33 of the manifold block 13 is engaged with the upper end of the rail 19, and a snap fit 34 is engaged with the lower end of the rail 19.

To secure the regulator block 14 to the manifold block 13, the regulator block 14 is formed with a bolt insertion hole 36 parallel to the fifth joint surface 25. The manifold block 13 is formed with a bolt insertion hole 37 for the above-described first position and a bolt insertion hole 38 for the second position. In addition, nuts 40 and 41 are disposed in the bolt insertion holes 37 and 38, respectively. The distance from the fifth joint surface 25 of the regulator block 14 to the center line of the bolt insertion hole 36 is equal to the distance from the third joint surface 23 of the manifold block 13 to the center line (extension thereof) of the bolt insertion hole 37 for the first position and also equal to the distance from the fourth joint surface 24 of the manifold block 13 to the center line (extension thereof) of the bolt insertion hole 38 for the second position.

When the regulator block 14 is fitted to the manifold block 13 in the first position, a bolt 43 (see FIG. 6B) is inserted into the bolt insertion hole 36 of the regulator block 14 and further inserted into the bolt insertion hole 37 of the manifold block 13. Then, the bolt 43 is screwed into the nut 40. Thus, the regulator block 14 is secured to the manifold block 13 in the first position. When the regulator block 14 is fitted to the manifold block 13 in the second position, the bolt 43 is inserted into the bolt insertion hole 36 of the regulator block 14 and further inserted into the bolt insertion hole 38 of the manifold block 13. Then, the bolt 43 is screwed into the nut 41. Thus, the regulator block 14 is secured to the manifold block 13 in the second position. In FIG. 1A, one of bolt insertion holes 39 for securing the pressure gauge 8 is shown. A nut 42 is fitted in the bolt insertion hole 39. Reference numeral 47 denotes a coupling assembly fitted to the outport.

Figure 2C:
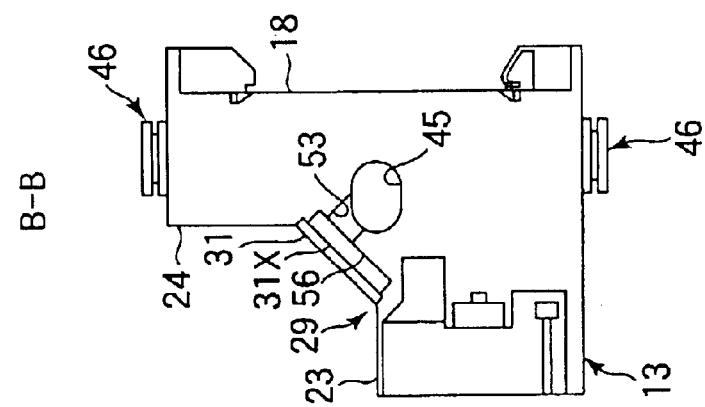
FIG. 2C is a sectional view taken along the line B—B in FIG. 2A.
Figure 2B:
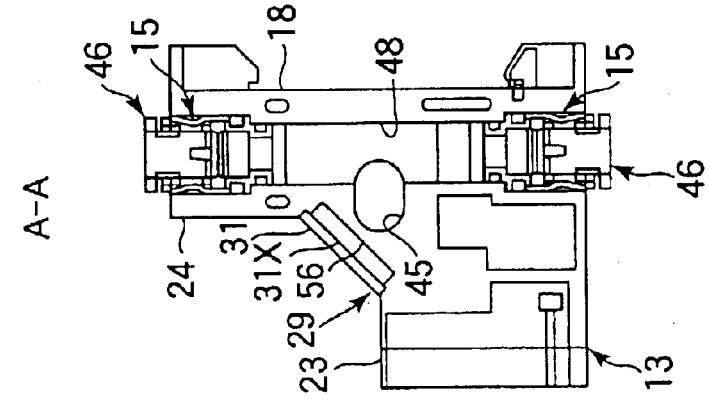
FIG. 2B is a sectional view taken along the line A—A in FIG. 2A.
Figure 2A:
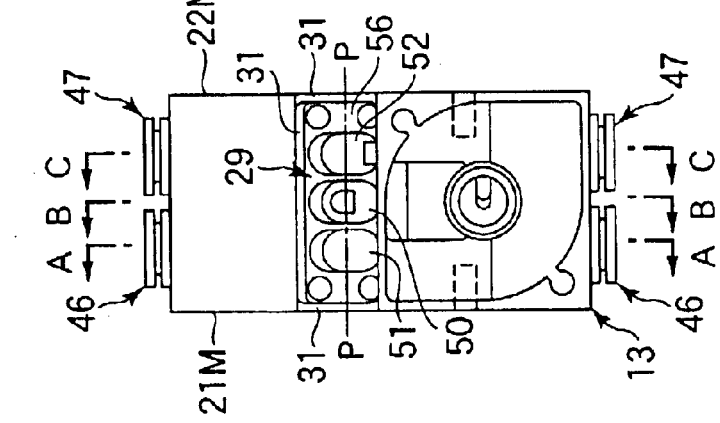
FIG. 2A is a front view of the manifold block in the present invention.

FIG. 2A is a front view of the manifold block 13. FIGS. 2B to 2D are sectional views taken along the lines A—A, B—B and C—C, respectively, in FIG. 2A. In the section A—A of FIG. 2B, an in-passage 48 is formed to extend vertically through the manifold block 13. Coupling assemblies 46 are respectively fitted to the upper and lower end portions of the in-passage 48. A common in-passage 45 is formed to extend through the center of the manifold block 13 as seen in the side view. A communicating outport 51 in the section A—A and the common in-passage 45 are cut off from each other.

In the section B—B of FIG. 2C, the common in-passage 45 and a communicating inport 50 are communicated with each other through a communicating passage 53. In the section C—C of FIG. 2D, an out-passage 49 is formed to extend vertically through the manifold block 13. Coupling assemblies 47 are respectively fitted to the upper and lower end portions of the out-passage 49. A communicating outport 52 in the section C—C and the out-passage 49 are communicated with each other through a communicating passage 54. It should be noted that FIG. 2A shows the manifold block 13 in a state where the pressure gauge 8 is removed.

The fitting portion 29 of the manifold block 13 is formed symmetrically with respect to a center line P—P (extending horizontally through the center of the fitting portion 29 in FIG. 2A) perpendicular to both the first joint surface 21M and the second joint surface 22M. The communicating inport 50 is formed in the center of the fitting portion 29 of the manifold block 13. The communicating outports 51 and 52 are formed at respective positions on both sides of the communicating inport 50 that are equidistant from the communicating inport 50. In other words, the fitting portion 29 is bilaterally symmetric in FIG. 2A.

Figure 3C:
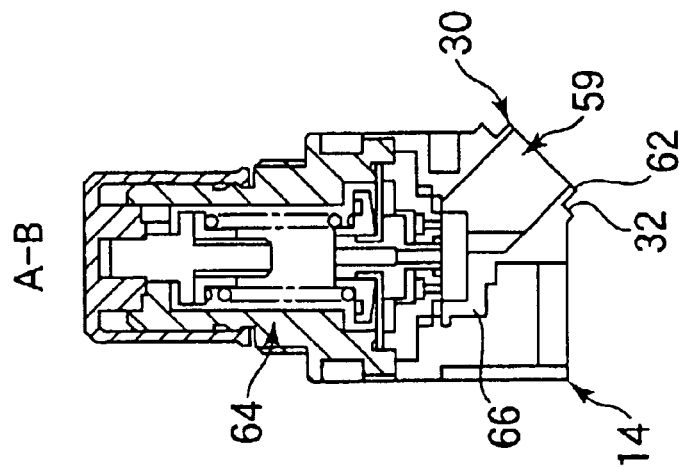
FIG. 3C is a sectional view taken along the line B—B in FIG. 3A.
Figure 3B:
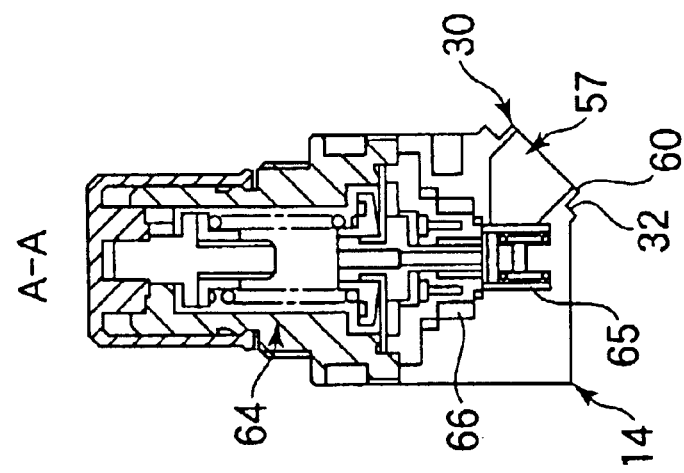
FIG. 3B is a sectional view taken along the line A—A in FIG. 3A.
Figure 3A:
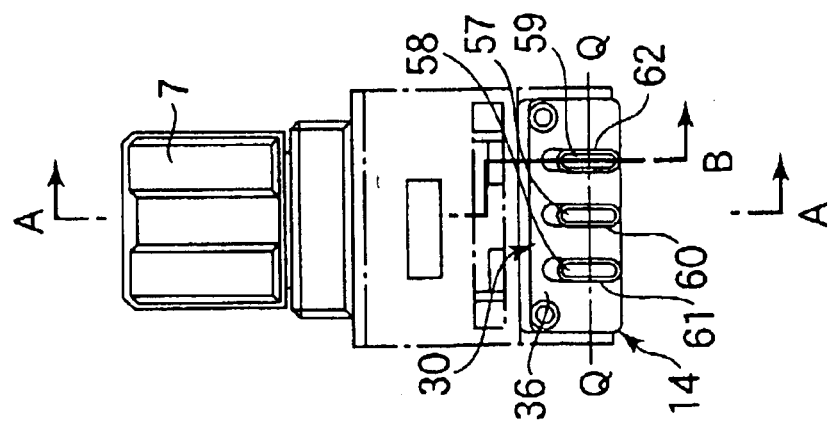
FIG. 3A is a front view of the regulator block in the present invention.

FIG. 3A is a front view of the regulator block 14. FIGS. 3B and 3C are sectional views taken along the lines A—A and A—B, respectively, in FIG. 3A. In the section A—A of FIG. 3B, a communicating inport 57 is communicated with a primary-side chamber 65 of the regulator 64. In the section A—B of FIG. 3C, a communicating outport 59 is communicated with a secondary-side chamber 66 of the regulator 64. The fitting portion 30 of the regulator block 14 is formed symmetrically with respect to a center line Q—Q (see FIG. 3A; extending horizontally through the center of the fitting portion 30) perpendicular to both the first joint surface 21R and the second joint surface 22R. A fitting hollow projection 60 is formed at the center of the fitting portion 30 of the regulator block 14. Fitting hollow projections 61 and 62 are formed at respective positions on both sides of the fitting hollow projection 60 that are equidistant from the fitting hollow projection 60. In other words, the fitting portion 30 is bilaterally symmetric in FIG. 3A.

A communicating inport 57 and communicating outports 58 and 59 are formed in the fitting hollow projections 60, 61 and 62, respectively. Consequently, the communicating inport 57 is formed in the center of the fitting portion 30 of the regulator block 14, and the communicating outports 58 and 59 are formed at respective positions on both sides of the communicating inport 57 that are equidistant from the communicating inport 57. The fitting hollow projections 60, 61 and 62 of the regulator block 14 can be inserted into the communicating inport 50 and the communicating outports 51 and 52 (or 52 and 51), respectively, of the manifold block 13. When the regulator block 14 is connected to the manifold block 13, the communicating inport 57 and the communicating outports 58 and 59 (or 59 and 58) of the regulator block 14 are communicated with the communicating inport 50 and the communicating outports 51 and 52 (or 52 or 51), respectively, of the manifold block 13. A gasket 55 (see FIG. 6A) is interposed between the contact surface 32 of the regulator block 14 and an inner contact surface 56 of the manifold block 13 (i.e. a recessed plane inside the frame-shaped contact surface 31) to prevent leakage of air from the above-described communicating ports. It should be noted that when the fitting portion 30 of the regulator block 14 is fitted to the fitting portion 29 of the manifold block 13, the contact surface 32 is brought into contact with a surface 31X (see FIG. 2B) parallel to the contact surface 31.

When the regulator block 14 is connected to the manifold block 13 in the first position, the fitting hollow projections 60, 61 and 62 of the regulator block 14 are fitted into the communicating inport 50 and the communicating outports 52 and 51, respectively, of the manifold block 13. When the regulator block 14 is connected to the manifold block 13 in the second position, the fitting portion 30 of the regulator block 14 is rotated through 180 degrees about the vertical axis from the first position (from FIG. 7A to FIG. 7C), and the fitting hollow projections 60, 61 and 62 of the regulator block 14 are fitted into the communicating inport 50 and the communicating outports 51 and 52, respectively, of the manifold block 13.

Figure 7B:
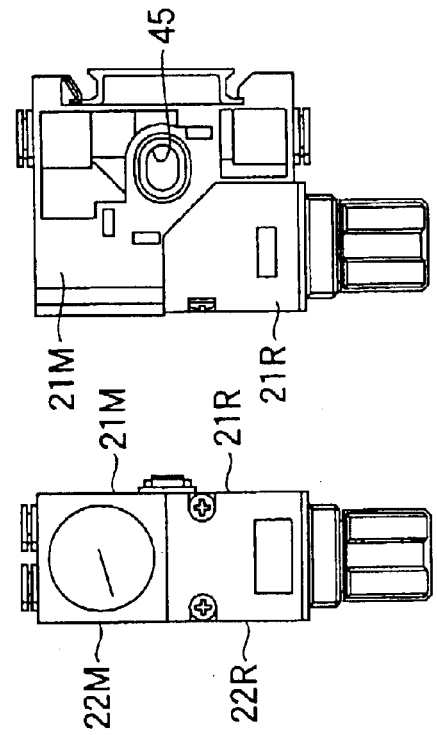

In FIG. 1A, a common in-passage 45 is formed to extend through the center of the second joint surface 22M of the manifold block 13. The opening portion of the common in-passage 45 is formed with an inner deep annular groove 68 and an outer annular groove 69 that is outside and adjacent to the annular groove 68. The annular groove 68 and the annular groove 69 are herein generically called "annular insertion groove". As shown in FIGS. 7B and so forth, an annular insertion groove is also formed around the common in-passage 45 in the center of the first joint surface 21M of the manifold block 13 as in the case of the second joint surface 22M.

Figure 4:
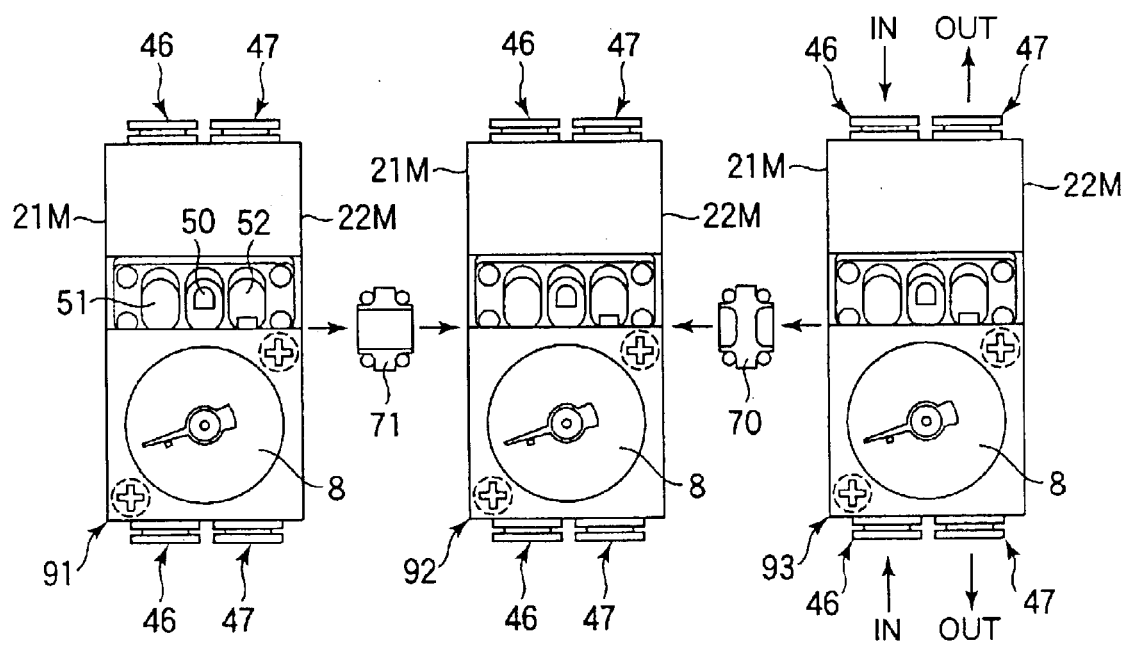
FIG. 4 is an explanatory view for describing the way in which bushes are installed.

FIG. 4 shows the way in which three manifold blocks 91 to 93 are joined together through bushes. The manifold blocks 91 to 93 each have annular insertion grooves formed on the first joint surface 21M and the second joint surface 22M. The annular insertion grooves are identical with those in FIG. 1. Either a cut-off bush 70 or a communicating bush 71 is interposed between each pair of adjacent manifold blocks. The cut-off bush 70 has a configuration in which annular projections project from both sides of a disk. O-rings are fitted on the respective outsides of the annular projections. The communicating bush 71 has a configuration in which an annular projection projects from the center of the outside of a short pipe. O-rings are fitted on the outsides of portions of the short pipe that project from both sides of the annular projection.

In FIG. 4, the right-hand half of the cut-off bush 70 is inserted into the insertion groove in the first joint surface 21M of the manifold block 93, and the left-hand half of the cut-off bush 70 is inserted into the insertion groove in the second joint surface 22M of the manifold block 92. In this way, the manifold blocks 93 and 92 are joined together. The cut-off bush 70 cuts off communication between the common in-passage 45 of the manifold block 93 and the common in-passage 45 of the manifold block 92. Consequently, the manifold block 93 is supplied with air individually. The right-hand half of the communicating bush 71 is inserted into the insertion groove in the first joint surface 21M of the manifold block 92, and the left-hand half of the communicating bush 71 is inserted into the insertion groove in the second joint surface 22M of the manifold block 91. Thus, the manifold blocks 92 and 91 are joined together. The communicating bush 71 provides communication between the common in-passage 45 of the manifold block 92 and the common in-passage 45 of the manifold block 91. Consequently, the manifold blocks 92 and 91 are supplied with air in common.

Figure 5:
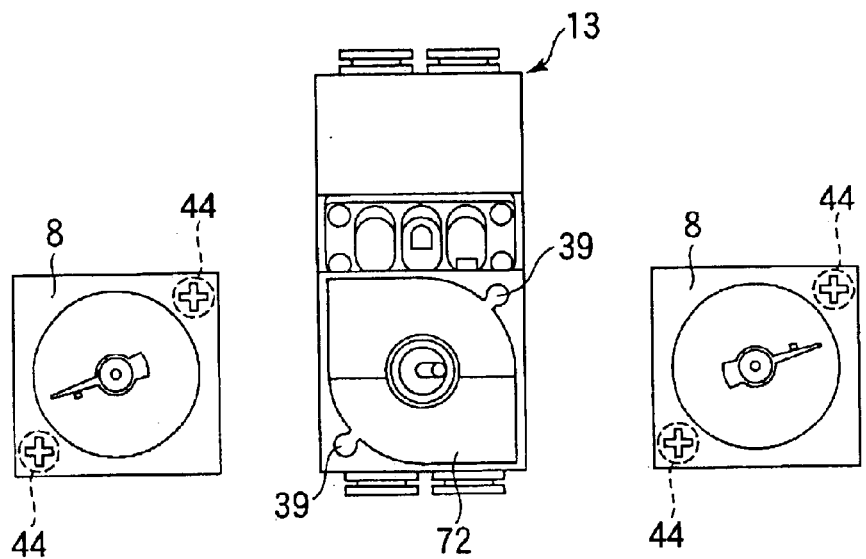
FIG. 5 is an explanatory view for describing the way in which a pressure gauge is installed.

FIGS. 5 and 1A show the way in which a pressure gauge 8 is installed. The pressure gauge 8 is integrated with a block that is square as seen in the front view. The pressure gauge 8 can be installed on a mounting surface 72 of the manifold block 13, which is in the central position, in either of two positions, i.e. a position shown in the left-hand side of FIG. 5 and a position shown in the right-hand side of FIG. 5, which are 180 degrees different from each other in terms of the pointer position. Bolts 44 are inserted into respective insertion holes in the block of the pressure gauge 8 and further inserted into the bolt insertion holes 39 of the manifold block 13 and screwed into the nuts 42, respectively, thereby securing the pressure gauge 8 to the manifold block 13. It should be noted that FIG. 1A shows only one of two bolt insertion holes 39 and only one of two nuts 42.

The regulator will be explained below with reference to FIGS. 6A and 6B. The structure of the regulator is the same as that of the conventional one. A valve seat assembly 74 and a diaphragm of a diaphragm assembly 78 are held between a bonnet 76 and a body 77. A valve 75 is disposed at a position facing opposite to the valve seat of the valve seat assembly 74. The valve 75 is connected to the diaphragm assembly 78 through a shaft. A pressure-control screw assembly 79 is engaged with an internal thread on the upper wall of the bonnet 76. A pressure-control knob 7 is secured to the pressure-control screw assembly 79. A pressure-control spring 80 is disposed between the pressure-control screw assembly 79 and the diaphragm assembly 78. A desired pressure is set by rotation of the pressure-control knob 7.

Figure 7C:
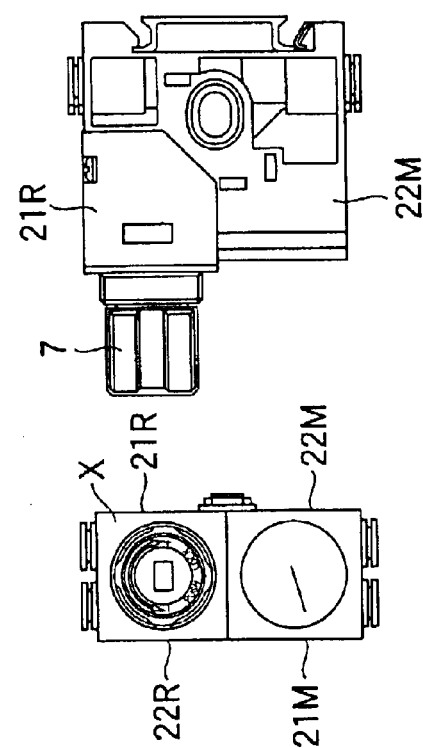
Figure 7D:
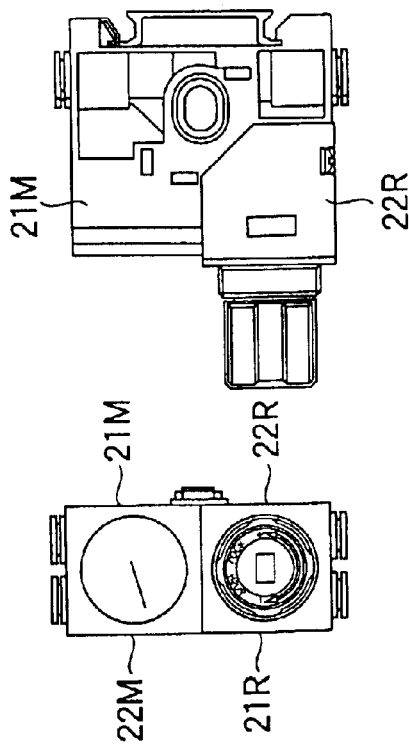

The fact that there are four different ways (as shown in FIGS. 7A to 7D) of connecting together the manifold block 13 and the regulator block 14 will be described below with reference to FIGS. 7A to 7D. In FIG. 7A, the manifold block 13 (manifold body) is in the regular position, and the regulator block 14 is in the first position. In FIG. 7B, the manifold block 13 is in the reverse position, and the regulator block 14 is in the first position. In FIG. 7C, the manifold block 13 is in the regular position, and the regulator block 14 is in the second position. In FIG. 7D, the manifold block 13 is in the reverse position, and the regulator block 14 is in the second position. It should be noted that the regulator block 14 can be mounted on a variety of mounting blocks used in place of the manifold block 13. For example, in a pilot-type regulator apparatus comprising a regulator body and a regulator for pilot pressure, the regulator body is considered to be a regulator block 14, and the regulator for pilot pressure is considered to be a manifold block 13. Thus, the regulator body and the regulator for pilot pressure can be connected together in the same way as in the case of the regulator block 14 and the manifold block 13 in the present invention.

Figure 8A:
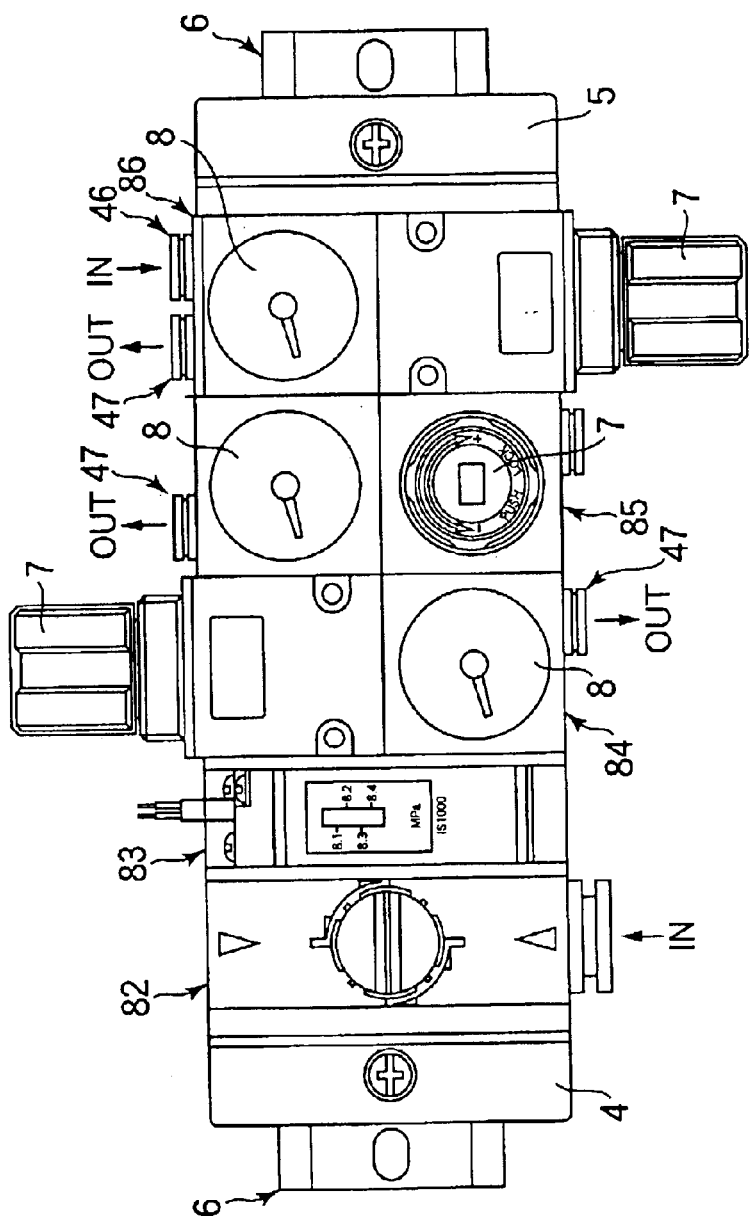
FIG. 8A is a front view of an example of the manifold regulator apparatus according to the present invention in which manifold bodies are arranged in a row.
Figure 8B:
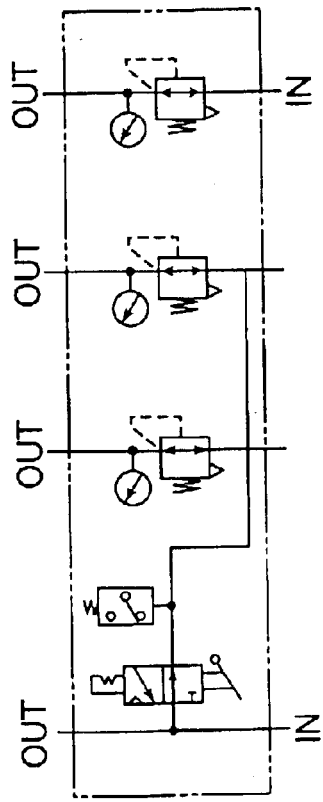
FIG. 8B is a circuit diagram of the example shown in FIG. 8A.

FIGS. 8A and 8B show an example of a manifold regulator apparatus in which pressure-control knobs 7 and pressure gauges 8 are disposed in desired locations and orientations. An on-off valve body 82, a pressure switch body 83, a manifold body 84, a manifold body 85, and a manifold body 86 are successively mounted on a rail 6 and joined together and further held by end plates 4 and 5. In the manifold body 84, a pressure gauge 8 is at a lower position, and a pressure-control knob 7 projects upward from an upper position. In the manifold body 85, a pressure gauge 8 is at an upper position, and a pressure-control knob 7 projects forward from a lower position. In the manifold body 86, a pressure gauge 8 is at an upper position, and a pressure-control knob 7 projects downward from a lower position.

As shown in FIG. 8B, the manifold bodies 84 and 85 are supplied with air in common. Pressure air passes through the on-off valve body 82 in an ON state and the pressure switch body 83 and flows into the common in-passages of the manifold bodies 84 and 85. A coupling assembly 47 is fitted to an outport on the bottom of the manifold body 84. The other ports (inport and outport) of the manifold body 84 are closed with plugs. A coupling assembly 47 is fitted to an outport on the top of the manifold body 85. The other ports (inport and outport) of the manifold body 85 are closed with plugs. Pressure air reduced in pressure in the manifold body 84 flows through the coupling assembly 47 at the lower end of the manifold body 84. Pressure air reduced in pressure in the manifold body 85 flows through the coupling assembly 47 at the upper end of the manifold body 85. The manifold body 86 is supplied with air individually. Pressure air flows into the manifold body 86 from a coupling assembly 46 at the upper end of the manifold body 86. Pressure air reduced in pressure flows out of the manifold body 86 through a coupling assembly 47 at the upper end of the manifold body 86.

Figure 9:
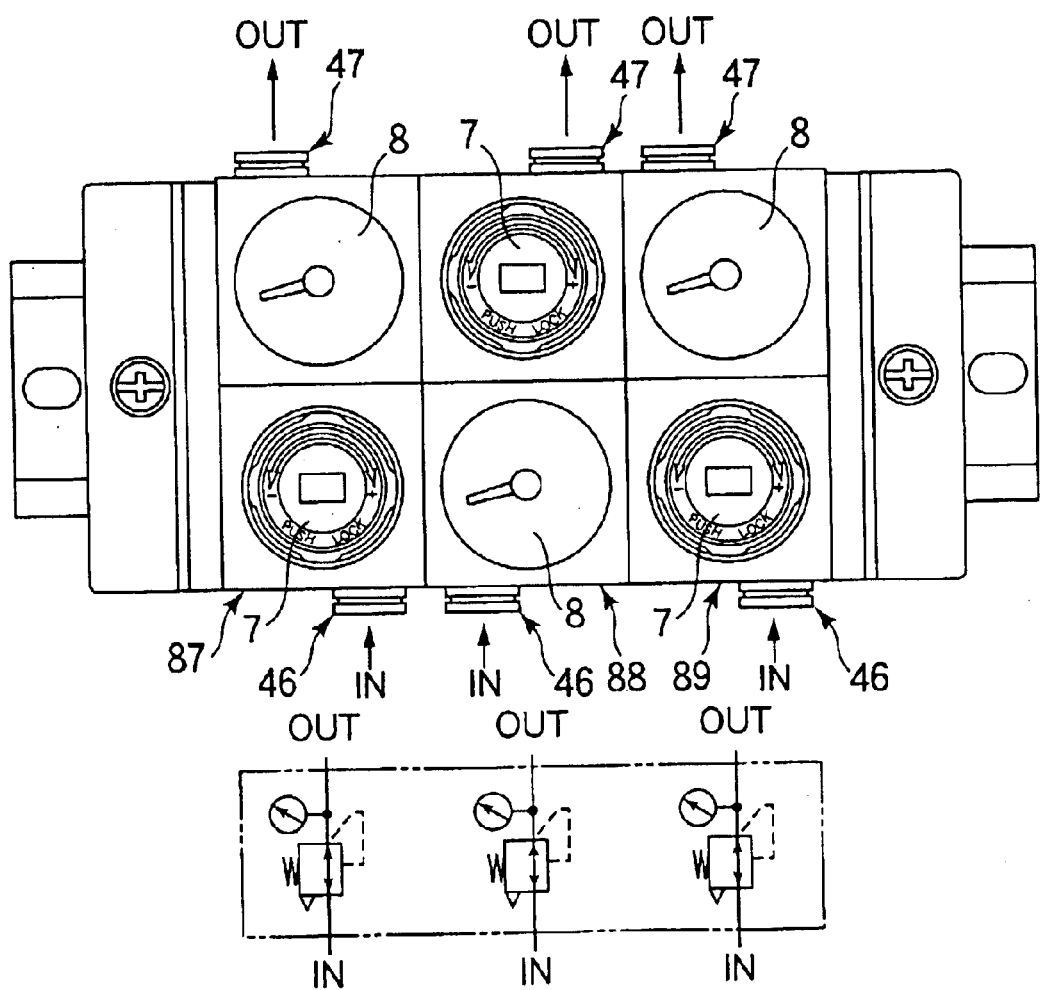
FIG. 9 is a front view of another example of the manifold regulator apparatus according to the present invention in which manifold bodies are arranged in a row.
Figure 10:
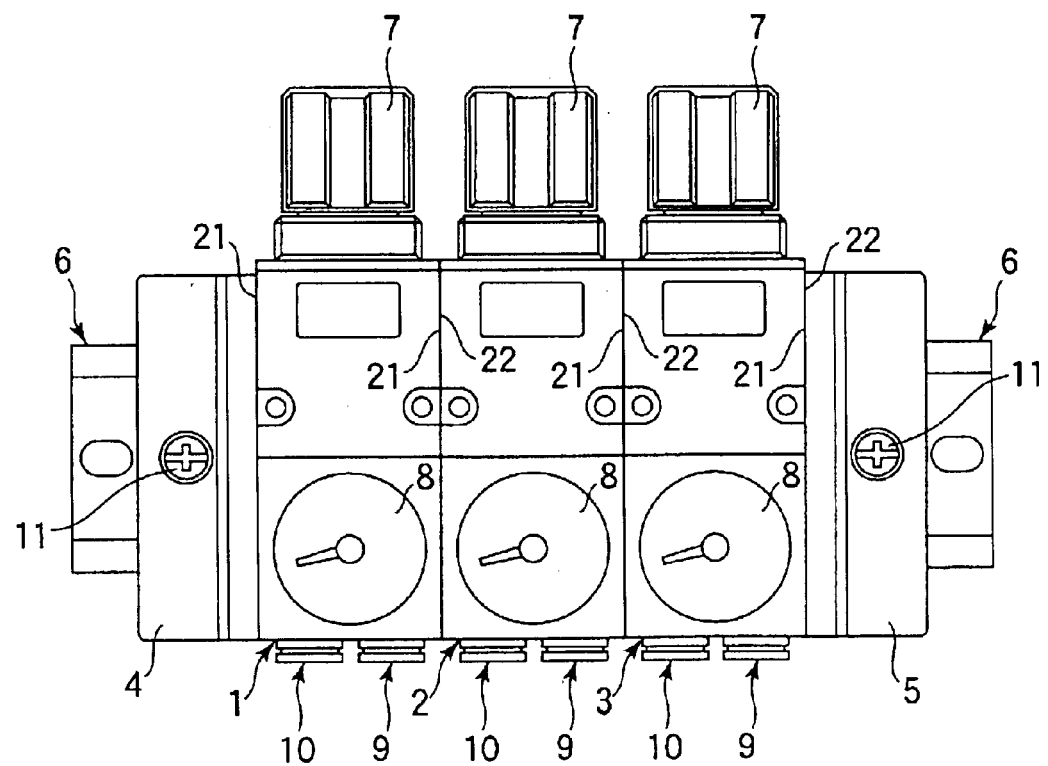
FIG. 10 is a front view of a conventional manifold regulator apparatus.

FIG. 9 shows another example of a manifold regulator apparatus in which pressure-control knobs 7 and pressure gauges 8 are disposed in desired locations and orientations. Manifold bodies 87 to 89 that are supplied with air individually are arranged in a row. In the manifold bodies 87 and 89, the manifold blocks 13 are in the reverse position, and the regulator blocks 14 are in the second position. In the manifold body 88, the manifold block 13 is in the regular position, and the regulator block 14 is in the second position. In each of the manifold bodies 87 to 89, pressure air flows in through a coupling assembly 46 at the lower end of the manifold body, and air reduced in pressure flows out through a coupling assembly 47 at the upper end of the manifold body. Inports and outports that are not used are closed with plugs.

What is claimed is:

1. A manifold body having a first joint surface and a second joint surface that are flat and perpendicular to a mounting surface, said manifold body comprising:
   a manifold block provided with a pressure gauge, an inport, and an outport; and
   a regulator block provided with a pressure-control knob and a regulator;
   wherein said manifold block and said regulator block have respective fitting portions that are at an angle of 45 degrees to said mounting surface as seen in a side view, each of said fitting portions being symmetric with respect to a center axis perpendicular to both said first joint surface and said second joint surface, so that said regulator block can be joined to said manifold block at either of two different angles.

2. A manifold body according to claim 1, wherein, as seen in the side view, said manifold block has a third joint surface and a fourth joint surface respectively provided at both ends of the fitting portion thereof contiguously with said fitting portion, said third joint surface being perpendicular to said mounting surface, said fourth joint surface being parallel to said mounting surface, and said regulator block has a fifth joint surface and a sixth joint surface respectively provided at both ends of the fitting portion thereof, said fifth joint surface being at an angle of 45 degrees to a contact surface of said fitting portion and perpendicular to a center line of said regulator block, said sixth joint surface being at an angle of 45 degrees to the contact surface of said fitting portion and parallel to the center line of said regulator block, so that the fitting portion of said manifold block and the fitting portion of said regulator block can be fitted to each other in either of two selectable positions, that is, a first position where said third joint surface and said fifth joint surface are joined together and said fourth joint surface and said sixth joint surface are joined together, and a second position where said third joint surface and said sixth joint surface are joined together and said fourth joint surface and said fifth joint surface are joined together.

3. A manifold body according to claim 1, wherein a communicating inport is formed in a center of each of the fitting portions of said manifold block and said regulator block, and communicating outports are formed at respective positions on both sides of said communicating inport that are equidistant from said communicating inport, so that when said manifold block and said regulator block are fitted to each other, the communicating inport of said manifold block and the communicating inport of said regulator block are communicated with each other, and the communicating outports of said manifold block and the communicating outports of said regulator block are communicated with each other.

4. A manifold body according to claim 2, wherein said regulator block has a bolt insertion hole formed therein parallel to said fifth joint surface to secure said regulator block to said manifold block, and said manifold block has a bolt insertion hole for said first position and a bolt insertion hole for said second position, wherein a nut is disposed in each of said bolt insertion holes for said first position and said second position, and wherein a distance from the fifth joint surface of said regulator block to a center line of said bolt insertion hole is equal to a distance from the third joint surface of said manifold block to a center line of the bolt insertion hole for said first position and also equal to a distance from the fourth joint surface of said manifold block to a center line of the bolt insertion hole for said second position.

5. A manifold body according to claim 3, wherein an inport and an outport open on each of a top and a bottom of said manifold block as seen in a front view, said inport being communicated with the communicating inport of said manifold block, said outport being communicated with either or both of the communicating outports of said manifold block, wherein a desired inport and a desired outport are closed.

6. A manifold regulator apparatus comprising:
   a plurality of manifold bodies as defined in claim 1, said manifold bodies being arranged in a row;

wherein each of said manifold bodies can assume a regular position and a reverse position, said reverse position being a position attained by turning the manifold body through 180 degrees from the regular position as seen in a front view, so that it is not only possible to join together a manifold body in the regular position and a manifold body in the regular position, but it is also possible to join together a manifold body in the regular position and a manifold body in the reverse position.

7. A manifold regulator apparatus according to claim 6, wherein said manifold block has a common in-passage extending through a center thereof as seen in a side view, said common in-passage being communicated with said communicating inport, and said first joint surface and said second joint surface have insertion grooves formed around said common in-passage, wherein when a plurality of manifold blocks are joined together, a cut-off bush for cutting off communication between the common in-passages or a communicating bush for providing communication between said common in-passages is inserted into said insertion grooves.

8. A regulator block having first and second vertical and flat joint surfaces formed on left and right sides thereof as seen in a front view, said regulator block being provided with a pressure-control knob and a regulator, wherein a fitting portion of a mounting block and a fitting portion of said regulator block are at an angle of 45 degrees to a center line of said regulator block as seen in a side view, each fitting portion being symmetric with respect to a center axis perpendicular to both said first and second joint surfaces, so that said regulator block can be joined to said mounting block at either of two different angles.

* * * * *